Patented July 20, 1937

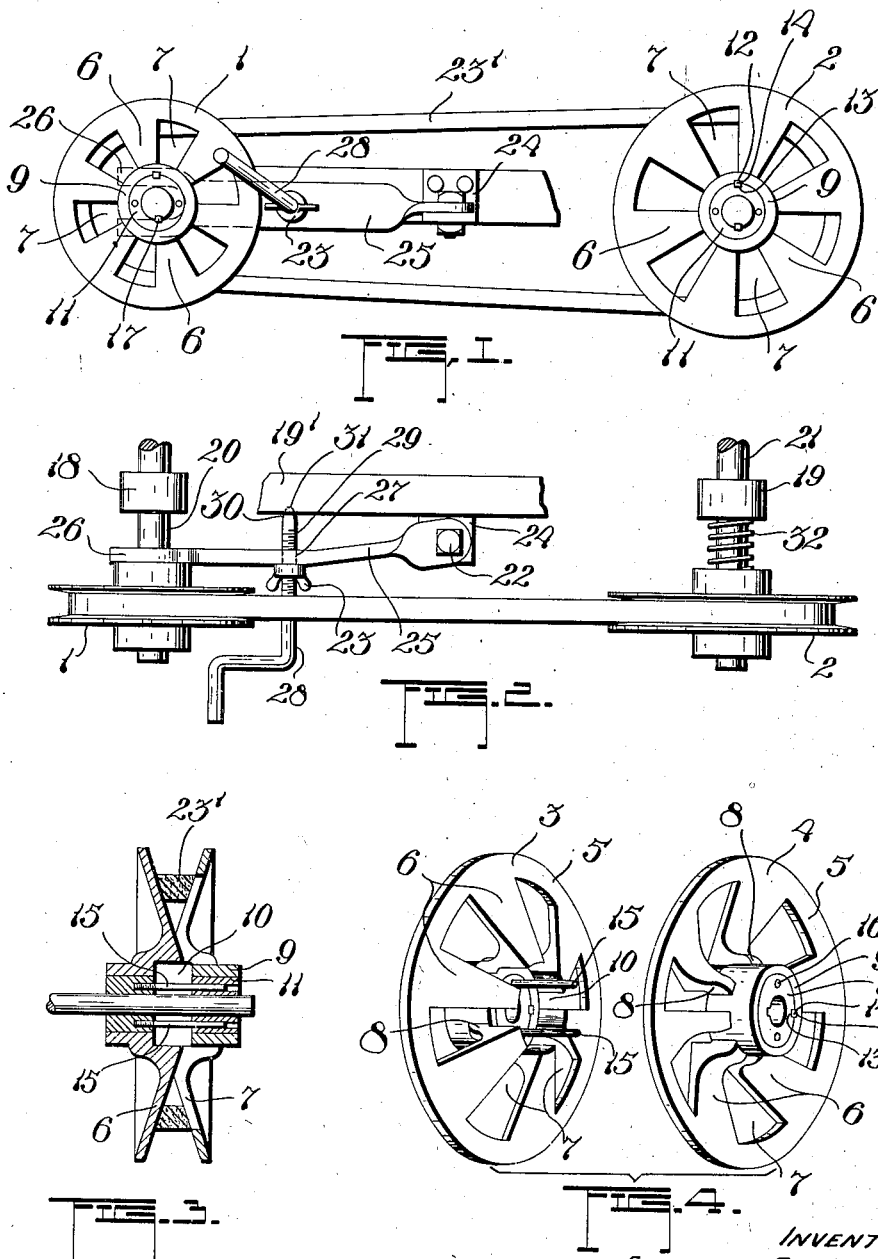

2,087,642

UNITED STATES PATENT OFFICE 2,087,642

PULLEY TRANSMISSION SYSTEM

Fredrick Forsberg, Robert Arthur Forsberg, and Casper Clarence Forsberg, Thief River Falls, Minn.

Application January 21, 1936, Serial No. 60,138

1 Claim. (Cl. 74—230.17)

Our invention relates to improvements in pulley transmission systems and an object of our invention is to provide a system of the character herein described utilizing a pair of specially designed pulleys around which is passed a belt, adjustment of the pulleys resulting in a change in the rotative speed of the driven shaft while the driving shaft speed remains constant.

A further object of our invention is to provide a device of the character herein described in which micrometer variations of speed of the driven shaft can be effected.

A further object of our invention is to provide a pulley of the character herein described in which the effective diameter thereof may be varied to change the speed of travel of a belt passing therearound.

A further object of our invention is to provide a device of the character herein described using two similar pulleys with a common belt passing therearound so that a reduction in the effective diameter of one pulley will result in an increase of the effective diameter of the companion pulley, thus maintaining the belt under constant tension.

A further object of our invention is to provide a device of the character herein described embodying means by which the effective diameter of the pulleys may be varied while they are stationary or in motion.

A further object of our invention is to provide a pulley of the character herein described which is formed of two similar sections or parts, each section having spokes and apertures therebetween and being of frusto-conical configuration, the spokes of one section being designed to be received within the apertures of the mating section.

A still further object of our invention is to provide a device of the character herein described which is simple to construct, economical to manufacture and will not easily become out of order.

With the above more important objects in view, and such other minor objects as may appear as the specification proceeds, our invention consists essentially in the arrangement and construction of parts all as hereinafter more particularly described, reference being had to the accompanying drawing, in which:—

Fig. 1 is an elevational view of a device using two of our pulleys and illustrating a means for varying the effective diameter thereof.

Fig. 2 is a plan view of the same.

Fig. 3 is a central sectional elevation of one of the pulleys.

Fig. 4 is a perspective exploded view of one of the pulleys.

In the drawing like characters of reference indicate corresponding parts in the different figures.

Our invention consists of a pulley transmission system, as illustrated in Figures 1 and 2 of the drawing accompanying this application, in which we use two divided pulleys 1 and 2. Each pulley is composed of two similar sections 3 and 4 and each section is provided with an outer encircling rim 5 from which extend a plurality of inwardly converging tapered spokes 6 with similarly shaped apertures 7 therebetween.

These spokes, it will be noted, due to their inward convergence, produce a device having an obtuse frusto-conical configuration and from the lower outer side of each spoke, extends a lug 8.

Within each section of the pulley, a collar 9 is inserted between the lugs 8 and is securely attached in that position. This collar, it will be noted, extends only a short distance along the bottom width of the lugs, thus leaving a deep central socket 10 within each of the sections 2 and 3 for a purpose presently to be explained.

Each of the collars 9 are designed to be received upon a hub 11 and aligned keyways 12 and 13 are cut within the collar and the hub respectively to receive a key 14. From the inner surface of one of the hubs of the wheel protrude two diametrically opposed pins 15 and longitudinal aligned orifices 16 are drilled within the hub of the mating section of the pulley to receive the pins 15. The hub of the outer section of each pulley is provided with a keyway 17 for attachment to the shaft upon which it is mounted. The hub of the inner section, however, is free to slide upon the shaft.

It should here be noted that each of the spokes of one of the pulley sections is opposed to an aperture in the companion section so that when the pins 15 are passed within the orifices 16, the two pulley sections may be moved together, the spokes of each section passing within the apertures of the mating section and the hubs of each section passing within the sockets 10 of the mating sections.

We make use of the above type of pulley in a mechanism which consists of bearings 18 and 19 mounted upon the framework 19' through which are passed shafts 20 and 21 respectively. A pair of our improved pulleys 22 and 23 are mounted upon the shafts 20 and 21 and the outer sections of each of these pulleys are keyed securely to the shafts. The inner sections, however, are free to slide upon the shafts.

A belt 23' having a cross sectional configuration as illustrated in Figure 3 is passed around the pulleys.

Attached to a framework 19' is an angulated bracket 24 and upon the horizontal portion thereof, we pivot a longitudinally twisted arm 25 by passing a bolt 22 through the bracket and the arm. This arm is provided with a bifurcated end 26 as illustrated most clearly in Figure 1 which passes on either side of the shaft 20 and bears against the inner surface of the inner hub of the pulley 1. If desired, in order to reduce friction within the mechanism, we may introduce ball bearings between the bifurcated end of the arm and the pulley hub.

Substantially centrally disposed along the length of the arm 25 is a tapped orifice 27 into which is passed a crank 28 having a threaded shank 29, the inner end 30 of which is tapered and is designed to be received within a recess 31 in the framework 19'. It will now be evident that rotation of the crank 28 in a clockwise direction will cause the arm 25 to pivot about the bolt 22 attached to the bracket 24 and press the bifurcated end 26 of the arm against the inner hub of the pulley 19. This will cause this section of the pulley to move into closer engagement with the outer section thereof, thus increasing the effective diameter of the pulley.

Rotating the crank in the opposite direction will release the pressure on the inner hub of the pulley and the belt tension will cause it to move away from its mating section and reduce the effective diameter of the pulley. Thus any effective diameter within the limits of the pulley may be obtained by rotating the crank. The arm 25 may be held in any position by merely binding the winged lock nut 23 thereagainst.

When the device is in motion and the belt 23' is moving around the two pulleys, causing the arm 25 to move inwardly and thus the sections of the pulley 22 to separate, will decrease the effective diameter of the pulley 1 and thus slacken the belt. In order that this slackening may be taken up by the companion pulley 2, we have provided a helical compressive spring 32 between the bearing 16 and the inner hub of the pulley 2 which will cause the two sections of the pulley to move into more intimate engagement and thus increase the effective diameter of this pulley and maintain the belt under a constant tensional force.

From the foregoing, it will now be evident that we have designed an extremely useful type of pulley transmission system which has the advantage of giving micrometer control of the speed of the driven shaft, is simple in construction and will not easily become out of order.

Since various modifications can be made in the above invention, and many apparently widely different embodiments of same, made within the scope of the claim without departing from the spirit and scope thereof, it is intended that all matter contained in the accompanying specification shall be interpreted as illustrative only and not in a limiting sense and we desire only such limitations placed thereon as are specifically expressed in the accompanying claim.

What we claim as our invention is:—

Improvements in pulley systems comprising a pair of pulleys, each pulley being composed of two similar sections, each section having a rim extending therearound and a plurality of inwardly converging spokes providing complementary apertures therebetween for the reception of the spokes of the other of said sections of one of said pulleys, an offset hub attached to the spokes of each of said sections providing a socket within each of said sections for the reception of the hub of the mating portion of each of said pulleys, said hub being composed of an inner collar attachable to a shaft and an outer collar removably attached to said inner collar, a pin extending from the inner collar of one of said sections of said pulley and receivable within an aligned orifice within the inner collar of the mating section of said pulley, a belt passing around said pulleys, means for manually adjusting the effective diameter of one of said pulleys comprising an arm pivotally attached to said framework provided with a threaded orifice extending therethrough, a crank having a threaded shank receivable within said orifice and bearable against said framework, a portion of said arm being bearable against the hub of one of said pulleys, rotation of said crank acting to vary the pressure of said arm against said hub and means for automatically varying the effective diameter of the other of said pulleys comprising a helical spring extending between said framework and said pulley and designed to actuate said last mentioned pulley upon a change in the effective diameter of said first mentioned pulley.

FREDRICK FORSBERG.
ROBERT ARTHUR FORSBERG.
CASPER CLARENCE FORSBERG.